May 3, 1927.

J. T. NORMAN 1,627,109

WAGON

Filed May 7, 1926

INVENTOR
Joseph T. Norman.

BY
Albert E. Dieterich
ATTORNEY

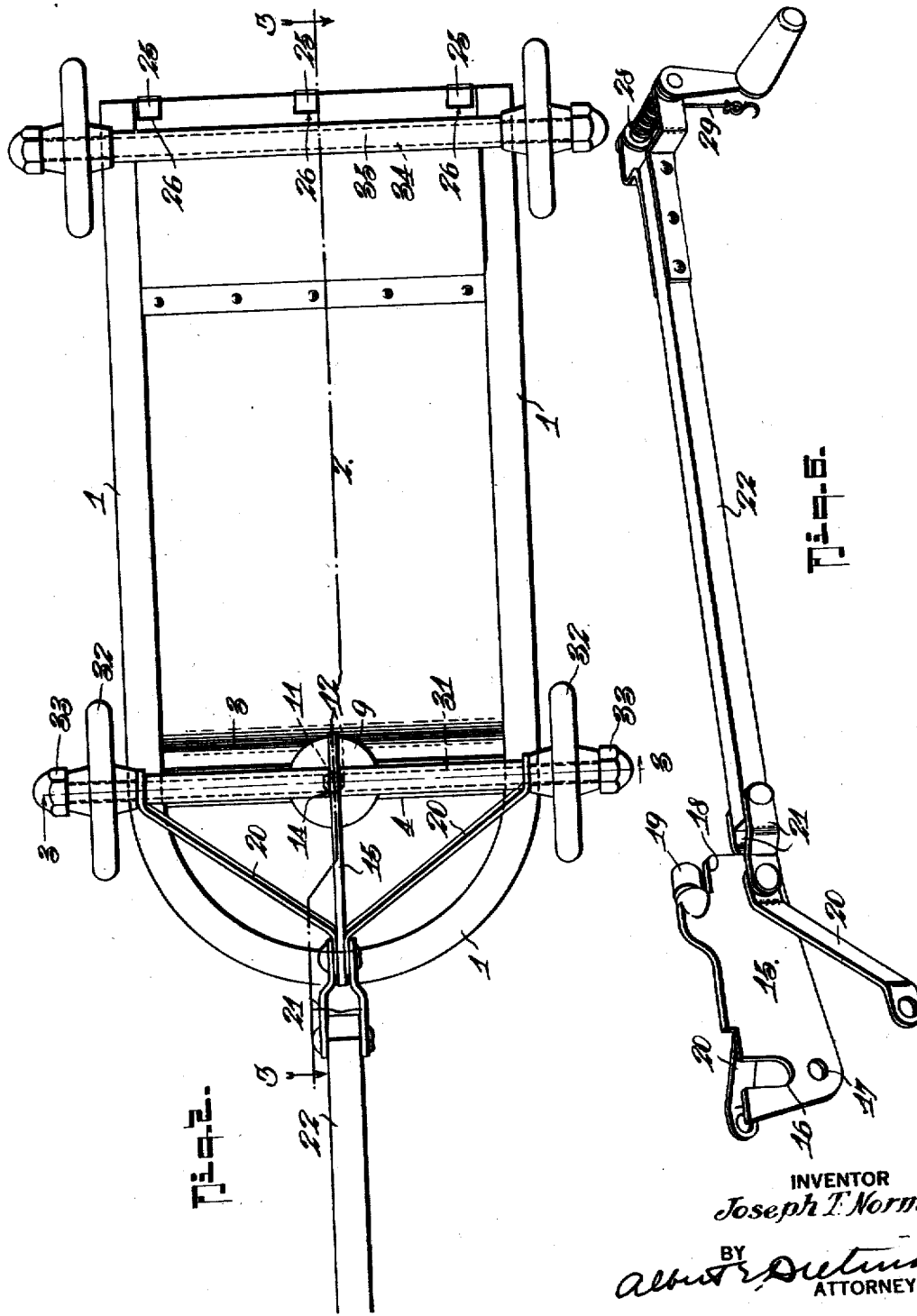

May 3, 1927.
J. T. NORMAN
1,627,109
WAGON
Filed May 7, 1926
3 Sheets-Sheet 3
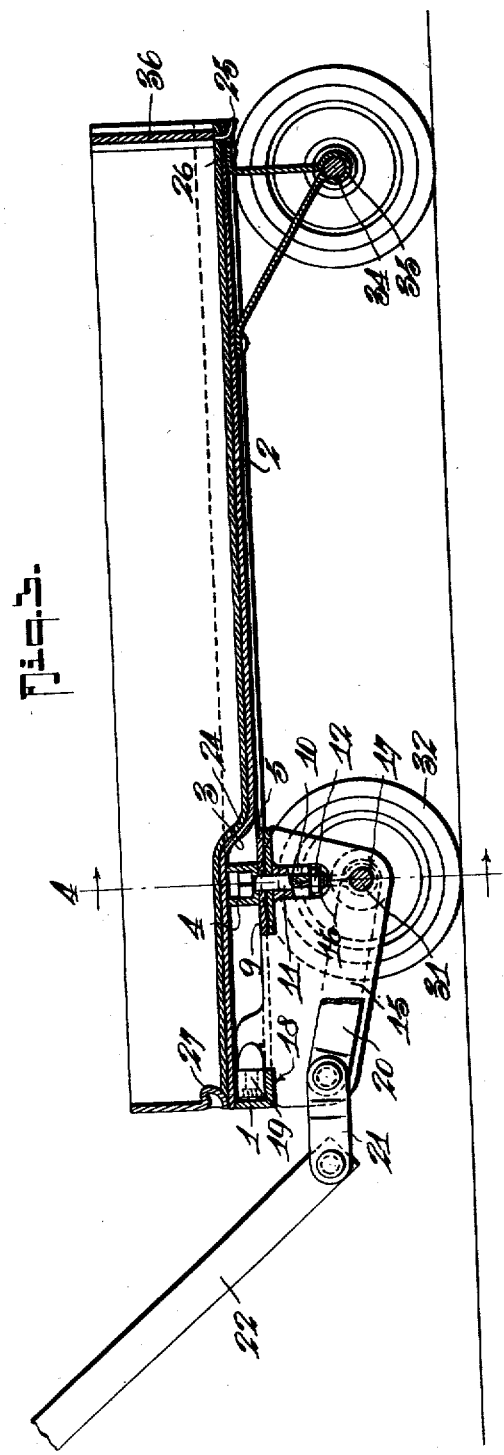
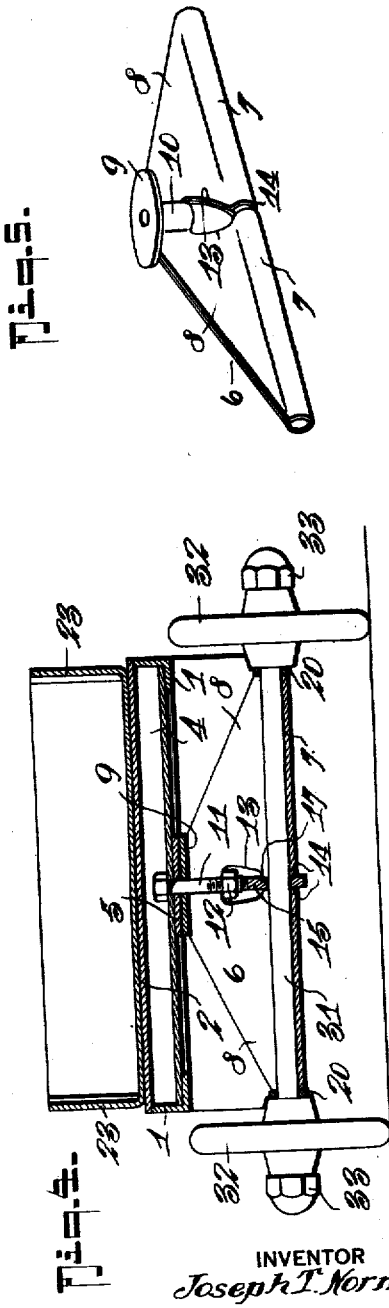
INVENTOR
Joseph T. Norman.
BY
Albert E. Dietrich
ATTORNEY :::info
Patented May 3, 1927.

1,627,109
:::

UNITED STATES PATENT OFFICE.

JOSEPH T. NORMAN, OF FREDERICK, MARYLAND.

WAGON.

Application filed May 7, 1926. Serial No. 107,401.

My invention has for its object to provide a certain new and useful construction of a wagon particularly adapted for children's use in which provision is made to relieve the bending stresses upon the king bolt, to distribute the pulling force over the length of the body, to provide a convertible coaster and dump-body wagon, and in general to improve the construction of the vehicle throughout.

More in detail the invention resides in the provision of an inexpensive effective construction of the fifth wheel and draft distributing parts which may be conveniently assembled and dissembled and in which the front axle is utilized as a locking bolt to retain the several movable parts of the front running gear assembled.

With other objects in view which will be apparent to those skilled in the art the invention also resides in those novel features of construction, combination and arrangement of parts, all of which will be first fully described, then be specifically pointed out in the appended claims, reference being had to the accompanying drawings in which:

Figure 2 is an inverted plan view of the vehicle.

Figure 3 is a central vertical longitudinal section on the line 3—3 of Figure 2.

Figure 4 is a cross section on the line 4—4 of Figure 3.

Figure 5 is a detail perspective view of the axle sleeve, the movable fifth wheel and brace member.

Figure 6 is a detail perspective view of the movable draft applying plate and its brace members with tongue attached.

Figure 1:
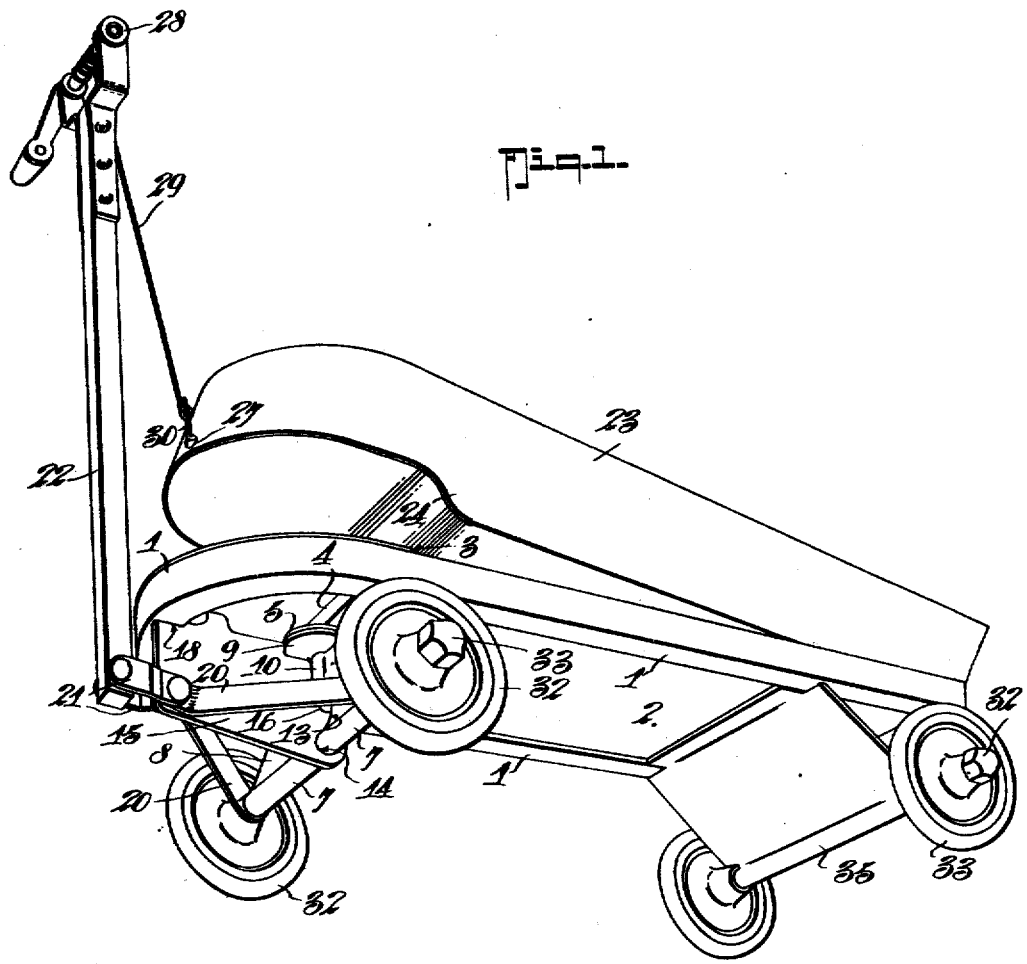
Figure 1 is a perspective view of the wagon embodying my invention and showing the dump action in full lines.

In the drawings in which like numerals of reference indicate like parts in all the figures, 1 represents the angle iron frame which is preferably bent into a U form. 2 is the floor which is stepped up at 3 at the front and widened to rest on the vertical edge of the bend of the frame 1, the remaining portion of the floor 2 resting on the flange of the angle iron 1 and being secured thereto by riveting, bolting, welding or in any other suitable manner.

4 designates a cross bar which is secured in the angle iron frame 1 and is bored to receive the king bolt 11. The cross bar 4 carries a stationary fifth wheel plate 5 as shown.

6 is the axle carrier and movable fifth wheel member. It is composed of the axle sleeve sections 7—7, the supporting webs 8, the king bolt bearing 10 and the fifth wheel plate 9. The web 8 is cut-away as at 13 and the sleeve sections 7—7 are separated as at 14 to enable the king bolt nut 12 to lie within the space 13 and to enable the combined draft plate, king bolt protector and nut guard 15 to fit in the space 14.

The combined draft plate, king bolt protector and nut guard 15 consists of a plate slotted at 16 to fit over the king bolt bearing 10 and of a depth corresponding to the depth of the king bolt so that its nut 12 may not drop off. The plate 15 extends forwardly and is provided with a slot 18 to receive the flange of the angle iron 1 as best shown in Figure 2 of the drawings. The plate may be provided with an anti-friction roller 19 if so desired.

17 is a hole in the plate 15 which lines up with the axle sleeves 7 so that when the front axle 31 is in place it will serve to secure the parts shown in Figures 5 and 6 in their assembled relation.

20 designate brace arms which are secured to the front of the plate 15 and are apertured to permit passage of the front axle 31. The front wheels 32 are held on the axle 31 by suitable nuts 33.

The tongue 22 is connected with the plate 15 by links 21, and at the front the tongue 22 is provided with a windlass 28 on which is wound a cable 29 having a hook 30 to fasten to the eye 27 on the front end of the body 23, the body 23 having an off-set portion 24 corresponding to the step 3 and having lugs 25 at the rear which enter slots 26 in the floor 2 and serve as pivots for the rear end of the body when being raised and lowered at the front end by means of the windlass 28.

The rear axle 34 is sustained in a suitable sleeve 35 mounted beneath the floor 2, suitably secured to the angle iron frame 1 and braced in a suitable way.

From the foregoing it will be seen that with a wagon constructed as herein shown and described, should the front wheels strike an obstruction in coasting the king bolt will be prevented from bending back by reason of the engagement of the roller 19 on the flange of the angle iron frame 1. Likewise when draft strains are applied, the underside of the slot of the plate 15 will engage the underside of the angle iron 1 and communicate any strains which would have a tendency to bend the king bolt to the frame 1, thereby reducing bending strains on the king bolt accordingly.

Further, by reason of the engagement of the plate 15 with the angle iron 1 at the back of the slot 18, pulling strains (especially if the king bolt connection becomes worn) will be applied directly to the angle iron frame 1 and be, by it, distributed along the full length of that frame, and in this way relieving the king bolt of unnecessary wear.

By removing the dump-body 23 a flat coaster or scooter type of wagon is provided. It is of course understood that when the dump-body is used a suitable end-gate 36 may be employed if desired.

While I have described my invention as particularly adapted to children's vehicle, it is quite obvious that it may be used as well on larger size wagons, and I do not, of course, wish to be limited in respect to size of wagons on which the invention may be used.

From the foregoing description, taken in connection with the accompanying drawings, it is thought the complete construction, operation and advantages of my invention will be clear to those skilled in the art to which it relates.

What I claim is:

1. In a wagon, a frame consisting of a pair of longitudinal side bars united at the front by a curved section, rear supporting wheels and a standard therefor on which the frame is mounted, front wheels and axle and means including a fifth wheel with a king bolt for mounting said frame on the front wheels and axle, and a means distinct from the fifth wheel and movable with the axle on the axis of the king bolt as a center to apply stresses which tend to bend the king bolt directly to said curved section of the frame, thereby relieving the king bolt, and a floor on said frame.

2. In wagons, a frame comprising an angle iron bent into a U shape, a floor having a stepped portion resting on the top edge of said angle iron adjacent the bend of the U and having a portion resting on the horizontal flange of the U within the confines of the frame, front and rear wheels and a fifth wheel on which said frame is mounted, a draft tongue, and a body comprising a bottom and upright walls, the bottom being shaped to fit said floor and be received by said angle iron frame along the sides.

3. In wagons, the combination with a U shaped frame, a stationary fifth wheel plate with a king bolt hole, the axis of which is at the center of curvature of the bend of the frame, an axle carrying body having a fifth wheel plate with a king bolt hole, a king bolt passing through said plates and having a nut, said axle carrying body having a pair of spaced axle sleeves, an axle held in said sleeves, a combined draft plate, king bolt protector and nut guard held by said axle and axle carrying body and having provision to engage the curved part of said frame for the purpose specified, a draft tongue secured to said draft plate, and a rear axle with wheels mounted at the rear of said frame substantially as shown and described.

4. In wagons, a frame consisting of a pair of side bars connected at the front by an arcuate section, a floor on said frame, rear wheels and an axle supporting the rear end of said frame, a stationary fifth wheel plate carried by said frame at the center of said arcuate section, an axle carrier and movable fifth wheel member including a fifth wheel plate, a pair of axle sleeves, a supporting web and a king bolt bearing, said web having an opening for the king bolt nut, a front axle, wheels mounted on said front axle, a king bolt with nut connecting said fifth wheel plates, said sleeves being spaced apart, a draft plate and king bolt protector apertured to permit passage of said front axle and slotted to fit over said king bolt bearing and nut, a draft tongue connected to said draft plate, said draft plate having provisions to engage said arcuate portion of the frame to transmit pulling and pushing strains directly to the frame to relieve the king bolt from bending stresses, substantially as specified.

5. In wagons, a floor, front and rear wheels and axles and means for mounting the same beneath said floor, the means for mounting the front wheels and axle comprising a fixed fifth wheel plate and an arcuate angle member fixed beneath the floor, a front axle carrier comprising axle sleeves, a king bolt bearing and a fifth wheel plate, a draft plate having a recess to receive the king bolt bearing and fifth wheel plate and slotted to fit over the flange of said angle member, and a draft appliance connected to the draft plate.

6. In wagons, a floor, front and rear wheels and axles and means for mounting the same beneath said floor, the means for mounting the front wheels and axle comprising a fixed fifth wheel plate and an arcuate angle member fixed beneath the floor, a front axle carrier comprising axle sleeves, a king bolt bearing and a fifth wheel plate, a draft plate having a recess to receive the king bolt bearing and fifth wheel plate and slotted to fit over the flange of said angle member, a draft appliance connected to the draft plate, and braces extending from the fore part of said draft plate to the outer ends of said axle sleeve and apertured to receive the axle, whereby said axle will hold said draft plate and said front axle with carrier assembled.

7. A means for supporting the steering end of a wagon, the same comprising a fixed fifth wheel plate and an arcuate angle member fixed beneath the wagon, a front axle carrier comprising axle sleeves, a king bolt bearing and a fifth wheel plate, a draft lying in a plane normal to the axis of the angle, said draft plate being apertured to permit passage of the axle, said draft plate having a recess to receive the king bolt bearing and slotted to fit over the flange of said angle member, a king bolt connecting said fifth wheel plates, and a draft appliance connected to the fore part of said draft plate.

8. A means for supporting the steering end of a wagon, the same comprising a fixed fifth wheel plate and an arcuate angle member fixed beneath the wagon, a front axle carrier comprising axle sleeves, a king bolt bearing and a fifth wheel plate, a draft plate lying in a plane normal to the axis of the angle, said draft plate being apertured to permit passage of the axle, said draft plate having a recess to receive the king bolt bearing and slotted to fit over the flange of said angle member, a king bolt connecting said fifth wheel plates, a draft appliance connected to the fore part of said draft plate, and braces extending from the point of connection of the draft appliance to the outer extremities of the axle sleeves, said braces having apertures to permit passage of the axle whereby said axle will hold said draft plate and said front axle carrier and said braces assembled.

JOSEPH T. NORMAN.

ceive the axle, whereby said axle will hold said draft plate and said front axle with carrier assembled.

7. A means for supporting the steering end of a wagon, the same comprising a fixed fifth wheel plate and an arcuate angle member fixed beneath the wagon, a front axle carrier comprising axle sleeves, a king bolt bearing and a fifth wheel plate, a draft lying in a plane normal to the axis of the angle, said draft plate being apertured to permit passage of the axle, said draft plate having a recess to receive the king bolt bearing and slotted to fit over the flange of said angle member, a king bolt connecting said fifth wheel plates, and a draft appliance connected to the fore part of said draft plate.

8. A means for supporting the steering end of a wagon, the same comprising a fixed fifth wheel plate and an arcuate angle member fixed beneath the wagon, a front axle carrier comprising axle sleeves, a king bolt bearing and a fifth wheel plate, a draft plate lying in a plane normal to the axis of the angle, said draft plate being apertured to permit passage of the axle, said draft plate having a recess to receive the king bolt bearing and slotted to fit over the flange of said angle member, a king bolt connecting said fifth wheel plates, a draft appliance connected to the fore part of said draft plate, and braces extending from the point of connection of the draft appliance to the outer extremities of the axle sleeves, said braces having apertures to permit passage of the axle whereby said axle will hold said draft plate and said front axle carrier and said braces assembled.

JOSEPH T. NORMAN.

CERTIFICATE OF CORRECTION.

Patent No. 1,627,109.  Granted May 3, 1927, to

JOSEPH T. NORMAN.

It is hereby certified that error appears in the printed specification of the above numbered patent requiring correction as follows: Page 3, line 9, claim 7, after the word "draft" insert the word "plate", and line 11, for the word "angle" read "axle"; same page, line 26, claim 8, for the word "angle" read "axle"; and that the said Letters Patent should be read with these corrections therein that the same may conform to the record of the case in the Patent Office.

Signed and sealed this 11th day of December, A. D. 1928.

(Seal)

M. J. Moore,
Acting Commissioner of Patents.

CERTIFICATE OF CORRECTION.

Patent No. 1,627,109.                                                                 Granted May 3, 1927, to

JOSEPH T. NORMAN.

It is hereby certified that error appears in the printed specification of the above numbered patent requiring correction as follows: Page 3, line 9, claim 7, after the word "draft" insert the word "plate", and line 11, for the word "angle" read "axle"; same page, line 26, claim 8, for the word "angle" read "axle"; and that the said Letters Patent should be read with these corrections therein that the same may conform to the record of the case in the Patent Office.

Signed and sealed this 11th day of December, A. D. 1928.

(Seal)                                                          M. J. Moore,
                                                                Acting Commissioner of Patents.